US005964457A

United States Patent [19]

Guajardo

[11] Patent Number: 5,964,457

[45] Date of Patent: Oct. 12, 1999

[54] COCKPIT INSTRUMENT PANEL CARRIER

[75] Inventor: Lorenzo Guajardo, Chesterfield, Mich.

[73] Assignee: General Motors Corporation, Detroit, Mich.

[21] Appl. No.: 08/995,114

[22] Filed: Dec. 19, 1997

[51] Int. Cl.[6] ........ B23Q 1/25

[52] U.S. Cl. ........ 269/61; 269/82; 269/296

[58] Field of Search ........ 269/60, 61, 82–85, 269/296; 188/17, 71.1, 72.1, 72.7, 72.9, 166

[56] References Cited

U.S. PATENT DOCUMENTS

| | | | |
|---|---|---|---|
| 1,450,511 | 4/1923 | Nielsen . | |
| 1,453,901 | 5/1923 | Andersen | 269/84 |
| 1,565,573 | 12/1925 | Klepac et al. . | |
| 1,600,835 | 9/1926 | Manley | 269/82 |
| 1,812,585 | 6/1931 | Collins | 269/61 |
| 2,324,919 | 7/1943 | Fine et al. . | |
| 2,593,738 | 4/1952 | Dollahite . | |
| 2,727,325 | 12/1955 | Jurinic . | |
| 2,741,830 | 4/1956 | Lewis . | |
| 2,846,761 | 8/1958 | Evans | 269/84 |
| 2,991,994 | 7/1961 | Kulp | 269/84 |
| 3,218,056 | 11/1965 | Kaplan et al. | 269/61 |
| 3,675,914 | 7/1972 | Douglass . | |
| 3,895,789 | 7/1975 | Mengeringhausen et al. . | |
| 4,200,273 | 4/1980 | Das Gupta et al. . | |
| 4,438,912 | 3/1984 | Gillot . | |
| 4,491,307 | 1/1985 | Ellefson . | |
| 5,692,738 | 12/1997 | DuVernay et al. | 269/82 |

*Primary Examiner*—Robert C. Watson
*Attorney, Agent, or Firm*—Charles E. Leahy; Kathryn A. Marra

[57] ABSTRACT

A cockpit carrier includes a welded frame having a first clamp and a second clamp rotatably mounted therein defining an axis of rotation. The clamps adapted to receive a cockpit flame. A gearbox is mounted between the first clamp and a handwheel to allow for manual rotational manipulation of the cockpit frame. The cockpit carrier further includes a brake caliper mounted to the welded frame, the caliper having friction pads disposed therein and a spring mounted thereto to bias the caliper in an engaged position. A lever pivotally attached to the lame and the caliper allows for manual positioning of the caliper in a disengaged position. The gearbox further has an input shaft and a brake disc mounted thereto. The brake disc 12 is positioned within the friction pads such that the friction pads provide a braking force against the disc in the engaged position to secure the cockpit frame in a selected rotational position and such that the friction pads do not contact the disc in the disengaged positioning allowing for the manual rotational manipulation of the cockpit frame about the rotation axis.

4 Claims, 4 Drawing Sheets

COCKPIT INSTRUMENT PANEL CARRIER

TECHNICAL FIELD

This invention relates generally to a workstation for supporting a large, heavy workpiece. In particular, this invention relates to a workstation which allows a worker to achieve an infinite number of positions from which to access a workpiece through the rotation of the workpiece about a single axis without external power assist devices

BACKGROUND OF THE INVENTION

It is well known in the manufacture of motor vehicles to utilize a workstand to support large, heavy pieces and permit assembly and testing of components thereof. Motor vehicles are typically assembled from modules and a typical workstand is constructed to allow worker access to permit successive steps of as much of the sub-assembly of a module as practical.

Existing workstands are designed to allow the rotation of a workpiece to permit access from a number of angles. Many of these workstands utilized external drives, such as hydraulic or electric or air motors, to provide the rotation force necessary to manipulate cumbersome modules. In addition these workstands are typically anchored to the assembly floor to provide a stable base and to allow for safe access to an external power source. In addition, existing workstands generally utilize a shot pin locking mechanism which permits the positive rotational location of the workpiece in predetermined positions. Other existing rotary workstands utilize rotary locks.

The modules for assembling motor vehicles have been growing larger and heavy and more complex in recent years. I here are manufacturing flow and cost advantages to performing as many operations as possible on a single module in a single rotary workstand. The increased size of these modules are making rotary manipulation using existing workstands difficult, expensive and inefficient. What is needed is a workstand that allows for the manual rotary manipulation of these modern modules for motor vehicles. The envisioned workstand would allow operators access to all aspects of a module during the manufacturing process with minimal effort and a minimal number of required operator movements.

SUMMARY OF THE INVENTION

This invention offers advantages and alternatives over the prior art by providing a workstation for manipulating a large, heavy workpiece which allows a worker access to the workpiece form any angle. The workstation preferably includes a gearbox and a large handwheel allowing for minimal manual effort to rotate the workpiece about a single rotational axis. The preferred workstation advantageously includes a braking system which allows for the positive positioning of the work piece at worker selected angular positions.

These advantages are accomplished in a preferred form of the present invention by providing for a workstation which allows for the rotation of a workpiece about a single rotational axis and which is a self-contained unit requiring no external power assisting devices. The workstation includes a handwheel and gearbox reducing unit which allows for minimal manual effort to enable rotational positioning of the workpiece. In a preferred embodiment of the present invention a mechanically operated disc braking system provides an operator with an infinite amount of rotational adjustment about the rotational axis. The braking system includes a spring return fail safe lever to positively bias the braking system in an activated position.

The above discussed and other features and advantages of the present invention will be appreciated and understood by those skilled in tile art from the following detailed description and drawings.

BRIEF DESCRIPTION OF THE DRAWINGS

The present invention will now be described, by way of example only, with reference to the accompanying drawings wherein like elements are numbered alike in the several Figures.

DESCRIPTION OF THE PREFERRED EMBODIMENT

Figure 1:
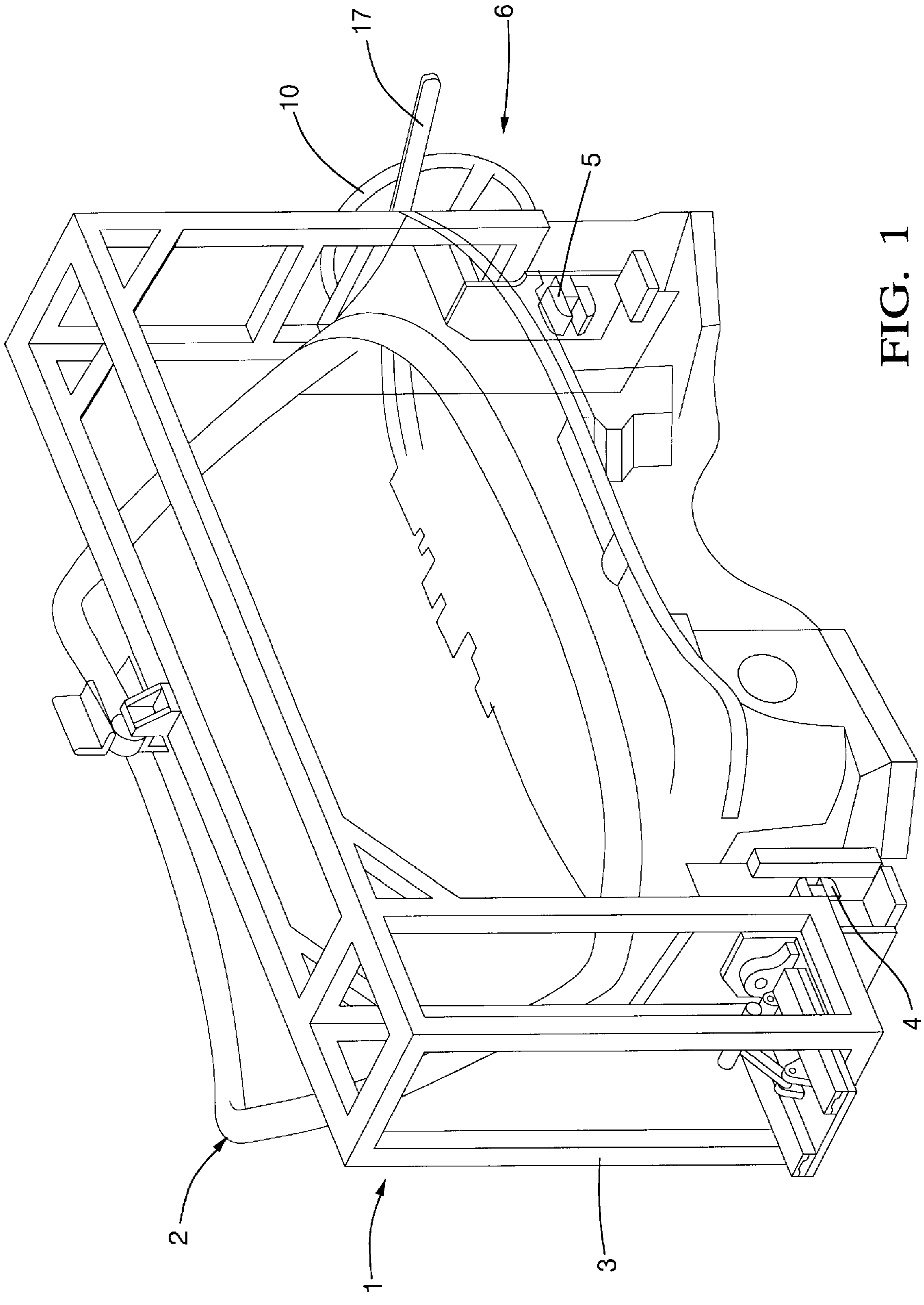
FIG. 1 is an isometric view of a cockpit carrier including a cockpit frame shown in phantom.
Figure 2:
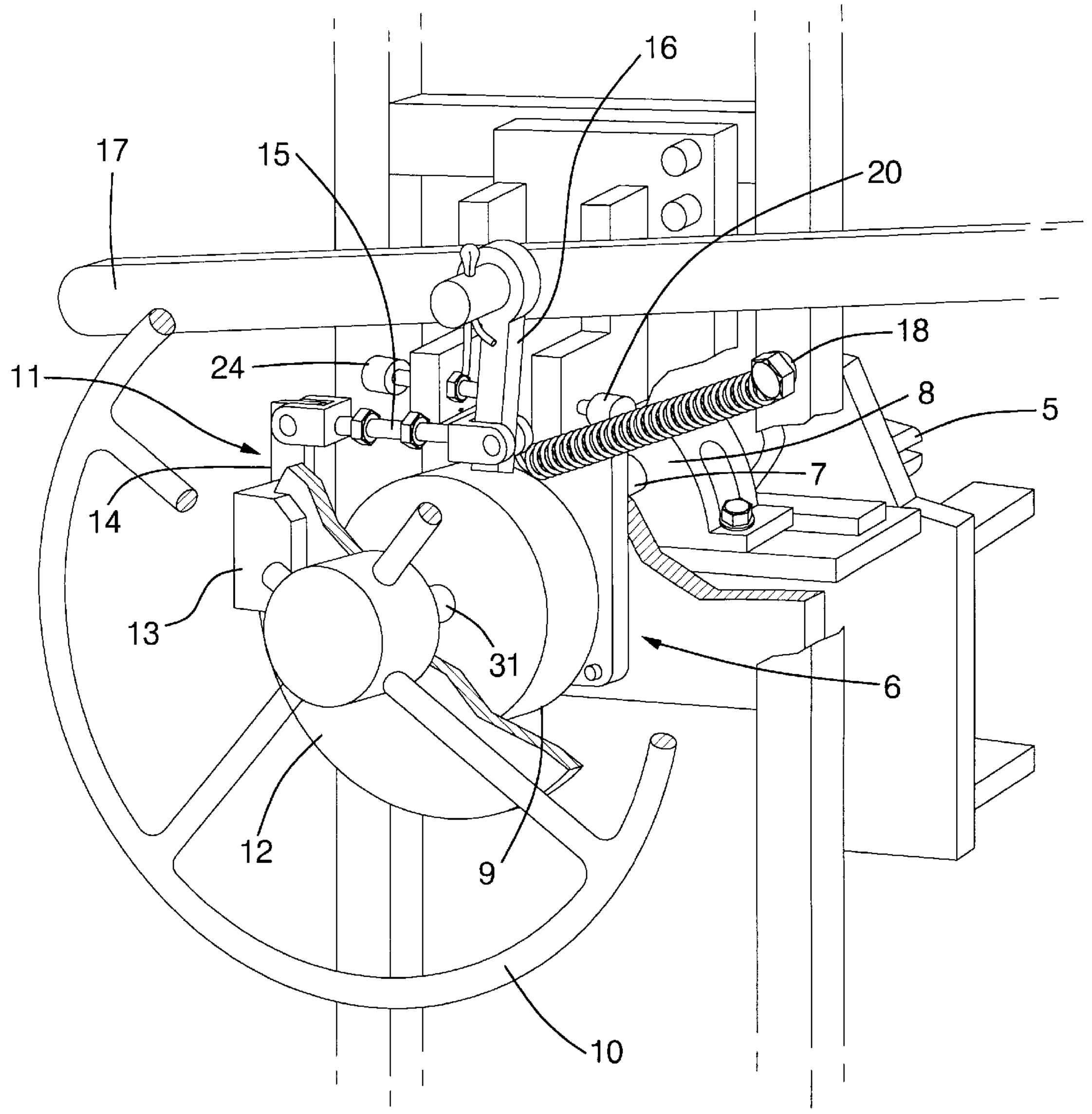
FIG. 2 is an isometric in partial section of a hand drive assembly and brake assembly.
Figure 3:
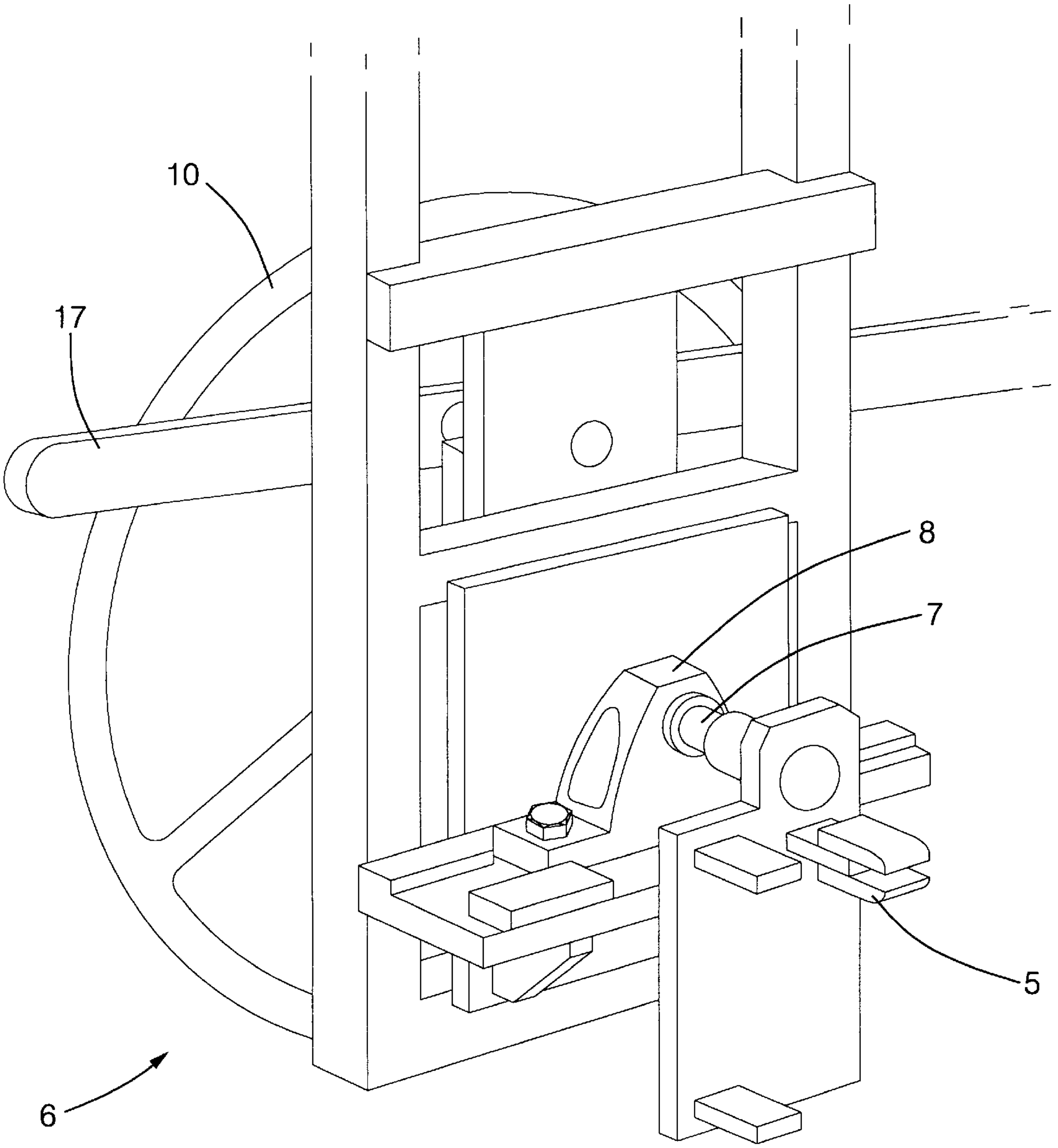
FIG. 3 is an isometric in partial section of a clamp, carrier bearing and output shaft.

Referring to FIG.1 there is shown a cockpit carrier, generally designated as 1, with cockpit frame 2 shown installed therein. Cockpit carrier 1 includes a welded steel frame 3 having a pair of clamps 4, 5 to secure cockpit 2 within the carrier. Clamp 5 is attached to a hand drive assembly, generally referred to as 6, as best shown in FIGS. 2 and 3. More specifically clamp 5 is mounted to an output shaft 7 which is rotationally supported within a carrier bearing 8 and attached to gearbox 9 having an input shaft 31 (as best shown in FIG. 2) and finally attached to a handwheel 10. The gearbox 9 includes a rotation gear reduction between the input shaft 31 and the output shaft 7 and together with the diameter of the handwheel 10 provides an operator with sufficient mechanical advantage to rotate for example, a cockpit frame 2 (weighing 250 pounds when fully assembled) by exciting only a 10 pound force on the handwheel 10. Gearbox 9 can be any commercial available gearbox that is capable of providing sufficient rotational gear reduction.

In addition, the cockpit carrier 1 includes a braking system, generally referred to as 11, as best shown in FIG. 2. Braking system 11 includes a brake disc 12 attached to the gearbox input shaft 31 and positioned within a brake caliper 13. Brake caliper 13 is mounted to frame 3 and has friction pads positioned therein for selectively halting the rotation of the hand-drive assembly 6 and in turn the cockpit subassembly. The braking system 11 further includes lever 17 which allows for hand operation of the brake caliper 13. An operator moves lever 17 up (as shown in FIG. 2) which rotates pivot arm 16, translates link arm 15 and in turn rotates an actuation lever 14 which de-activates the brake caliper 13. Pivot arm 16 and Braking system 11 further includes a spring 18 mounted between the frame 3 and pivot arm 16 to bias the pivot lever against stop 20 and thereby positioning actuation lever 14 and brake caliper 13 in an engaged position. In the engaged position the friction pads within the brake caliper 13 are forced against the brake disc 12 to prevent rotation of the drive assembly 6. The upward displacement of the lever 17 cause the force produced by spring 18 to be overcome and positioned in a disengaged position releasing the friction pads from contact with tile brake disc 12 allowing rotation of the drive assembly 6. Stop 20 is an adjustable stop comprising a bolt 21 threaded through stop support bracket 22 and lock nut 23 to allow for adjustment of the travel of pivot arm 16 and actuation lever 14 as the friction pairs wear during use. Similarly, stop 24 is comprised of bolt 25 threaded through stop support bracket 26 and locknut 27 to provided an adjustable stop for the travel of pivot arm 16 in the disengage position. The brake disc 12 and brake caliper 13 brake system 11 provides for infinite rotational adjustment of the drive assembly 6. Brake disc 12 is for example a 10 inch disc which is commercially available from a number of sources. Brake caliper 13 is also, for example available from a number of commercial sources. The braking system 11 together with the mechanical advantage of the gearbox 9 produce sufficient braking force to resist rotational movement of the cockpit frame 2 during manufacturing and handling operations.

Figure 4:
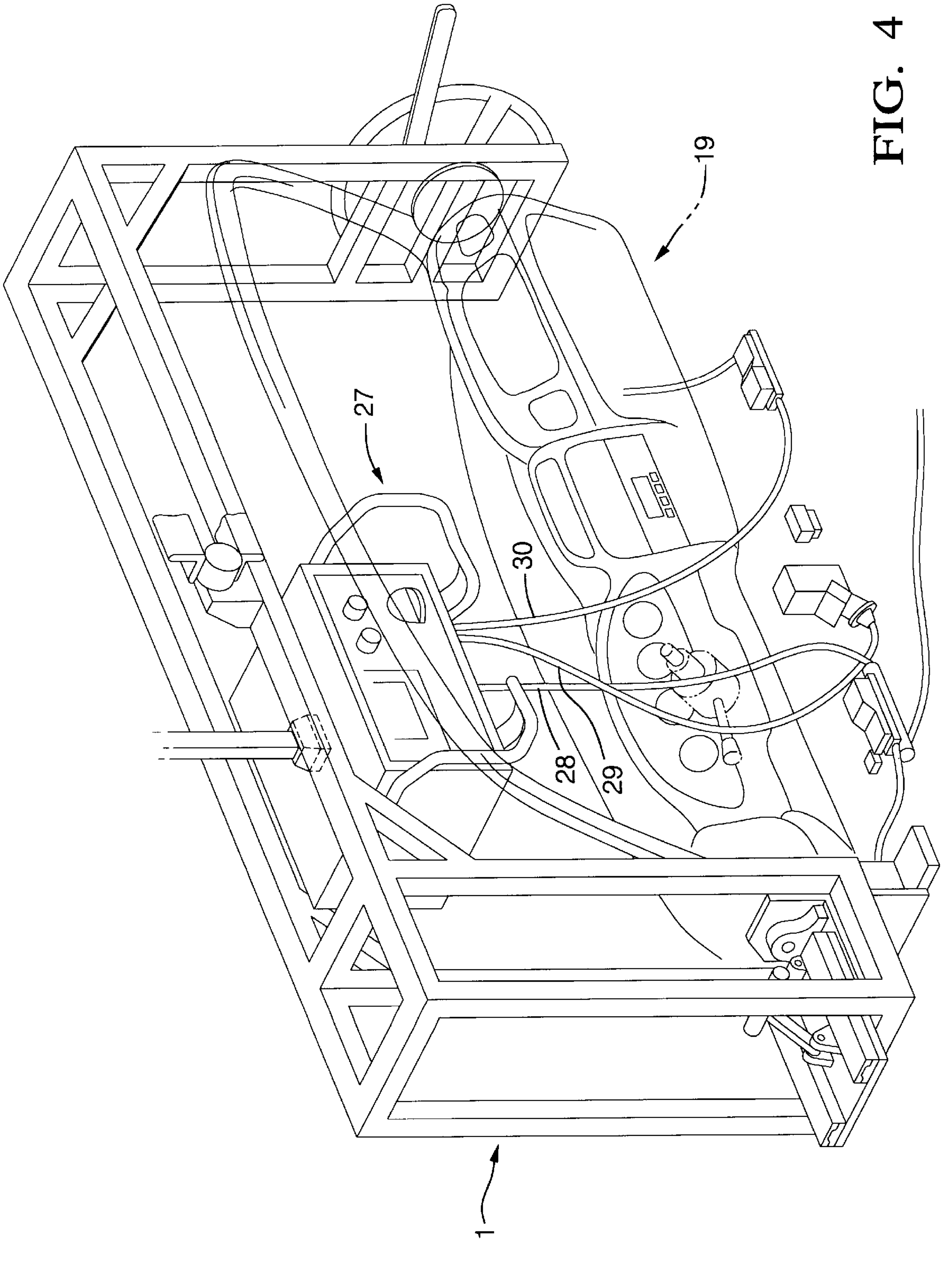
FIG. 4 is an isometric view of a cockpit carrier including a cockpit sub-assembly shown in phantom .

During the subsequent manufacturing operations cockpit 2, to produce a completed cockpit sub-assembly generally referred to as 19 as best shown in FIG. 4, an operator opens clamps 4, 5 as best shown in FIG. 1 and a cockpit frame 2 is loaded into the cockpit carrier 1 by a suitable load assist device (not shown). The operator closes clamps 4, 5 securing the cockpit frame 2 therein and the cockpit frame 2 within the cockpit carrier 1 is transported to an assembly line (not shown) for build up operations. While the cockpit carrier 1 is transported and consequently utilized in assembly operations, spring 18 provides a fail-safe mechanism by sustaining sufficient force against pivot arm 16 and in turn actuation lever 14 to maintain the friction pads in contact with the brake disc 12 to prevent rotation of the cockpit frame 2. As the cockpit carrier 1 is moved from station to station along the assembly line subsequent stations may require a unique rotary position of the cockpit frame 2 to facilitate access, view, and assembly of various components. At any particular station the operator lifts lever 17 which causes pivot arm 16 to move against stop 21 overcoming the biasing force produced by spring 18 thereby moving the actuation lever 14 placing the caliper 13 in a disengaged position. With the brake caliper 13 in the disengaged position the hand drive assembly 6 is free to rotate and the operator manually turns handwheel 10 to rotationally manipulate the cockpit frame 2. When the operator has positioned the cockpit fame in an optimal rotational position the lever 17 is released and spring 18 again biases the brake caliper 13 into the engaged position and the cockpit frame 2 is prevented from rotation. After work is completed at a particular station along the assembly line the cockpit carrier 1 is indexed to a next station and the operator at the station repeats the rotational positioning process described herein above to select the optimal position for the station.

As best shown in FIG. 4 cockpit carrier 1 is advantageously well suited used for diagnostic testing and quality control procedures on cockpit sub-assembly 19. The cockpit carrier 1 including the cockpit sub-assembly 19 is positioned near a diagnostic tool 27 where test leads 28, 29, 30 are connected to various components within the cockpit sub-assembly 19. The cockpit carrier 1 of tile present invention permits the operator to manipulate the cockpit sub-assembly 19 into a number of rotational positions allowing access to connect the test leads and to perform various diagnostic tests all an optimal, albeit different, rotational position.

Upon completion of the manufacturing operations, the cockpit sub-assembly 19 is removed from the cockpit carrier 1 by opening clamps 4, 5 and removing the sub-assembly 19 utilizing a suitable load assist device (not shown).

It will be understood that a person skilled in the art may make modifications to the preferred embodiments shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An apparatus for rotary manipulation of a workpiece, the apparatus comprising:

a frame structure;

a first clamp adapted to releasibly position the workpiece therein, the first clamp rotatably disposed in the frame striker;

a gearbox fixedly disposed at the frame and having an input shaft and an output shaft, the output shaft being coupled to the first clamp; and a brake disc disposed at the input shaft;

a brake caliper moveable between a first position and a second position;

a spring coupled to the caliper to bias the caliper in the first position to engage the caliper with the disc; and a lever coupled to the caliper to position the caliper in the second position to disengage the caliper from the disc to provide for rotational positional adjustment of the workpiece.

2. A cockpit carrier for rotary manipulation of a cockpit sub-assembly about an axis of rotation, the apparatus comprising:

a frame comprised of welded structure;

a first clamp adapted to releasibly position the cockpit sub-assembly therein, the first clamp rotatably disposed at the frame;

a second clamp adapted to releasibly position the cockpit sub-assembly therein, the second clamp rotatably disposed at the frame and in axial alignment with the first clamp thereby defining the axis of rotation;

a gearbox disposed at the frame and having an input shaft and an output shaft to provide a rotational gear reduction relationship between the input shaft and the output shaft, and the output shaft coupled to the first clamp;

a handle coupled to the input shaft to allow for manual rotation of the input shaft;

a brake caliper having a first position and a second position, the caliper disposed at tile frame and having an actuation lever, and a pair of friction pads;

a spring attached to the actuation lever to bias the actuation lever in the first position;

a lever pivotally coupled to the actuation lever to allow for manual movement of the actuation lever to the second position; and a disc coupled to the input shaft positioned within the friction pads such that the friction pads engage the disc in the first position to secure the cockpit sub-assembly in a rotational position and further positioned such that the friction pads disengage the disc in the second position to allow for positioning of the workpiece about the rotational axis.

3. A cockpit carrier as set forth in claim 2 wherein the handle is comprised of a wheel.

4. A cockpit carrier as set forth in claim 2 wherein the lever includes in amount of travel, the apparatus further comprising a pair of stops positioned to contact the lever at a pair, of predetermined positions to limit the amount of travel.

* * * * *